Oct. 6, 1970  W. B. NOE  3,532,440
TIDALLY OPERATED SYSTEM FOR PUMPING WATER OUT
OF BOATS AND FLOATING DOCKS
Filed Jan. 13, 1969  5 Sheets-Sheet 1

INVENTOR
WILLIAM B. NOE
BY
ATTORNEY

Oct. 6, 1970 W. B. NOE 3,532,440
TIDALLY OPERATED SYSTEM FOR PUMPING WATER OUT
OF BOATS AND FLOATING DOCKS
Filed Jan. 13, 1969 5 Sheets-Sheet 5

INVENTOR
WILLIAM B NOE
BY
ATTORNEY

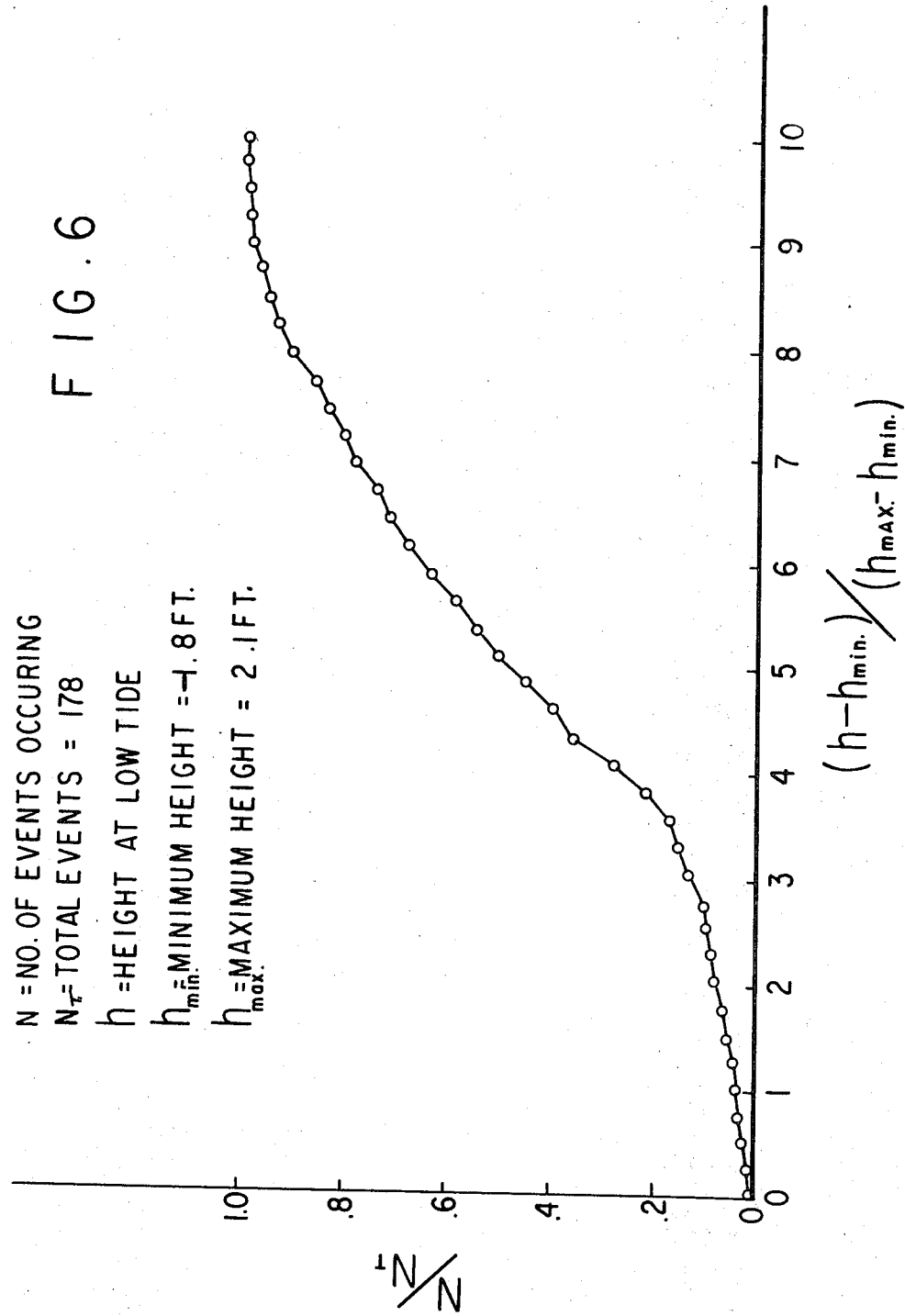

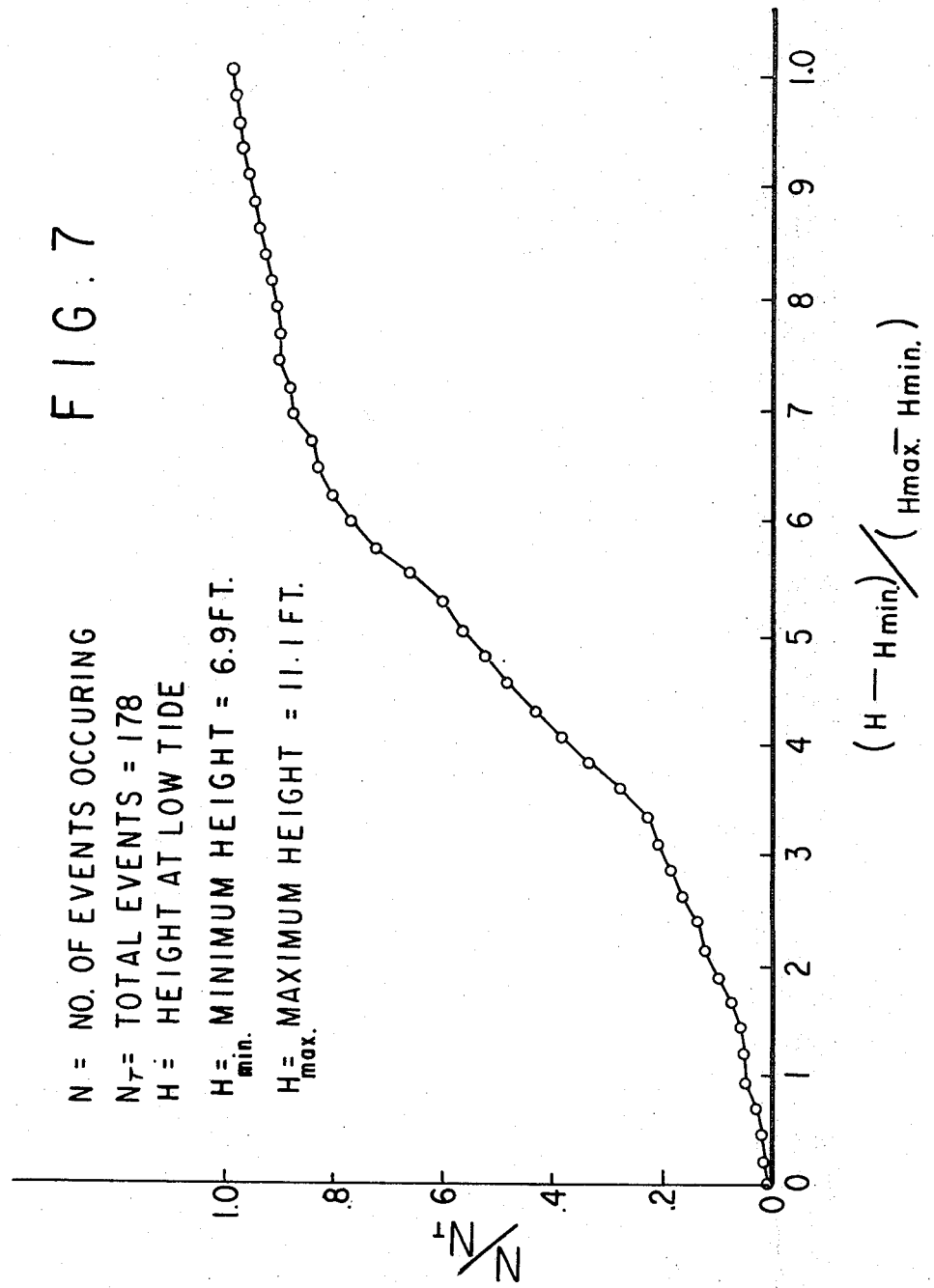

United States Patent Office 3,532,440
Patented Oct. 6, 1970

3,532,440
**TIDALLY OPERATED SYSTEM FOR PUMP-
ING WATER OUT OF BOATS AND FLOAT-
ING DOCKS**
William B. Noe, 3540 Ewell St.,
Annandale, Va. 22203
Filed Jan. 13, 1969, Ser. No. 790,787
Int. Cl. F04b *23/04;* E04f *5/10;* E02b *9/00*
U.S. Cl. 417—76                        7 Claims

ABSTRACT OF THE DISCLOSURE

A system for pumping water out of a boat or dock floating on tidal water including a jet pump in the boat or dock, a floating first tank, fixed second and third tanks and fluid flow connections between the tanks arranged so that the first and second tanks are filled with water at high tide and water is drawn into the third tank at low tide and is subsequently released to deliver the water to the jet pump and operate the same to pump water out of the boat or dock.

BACKGROUND OF THE INVENTION

The present invention relates to a system for pumping water out of boats which can be operated twice a day by the rise and fall of the tides.

Heretofore, systems have been devised for pumping water out of moored boats which depended upon the rocking of the boat due to waves. A disadvantage of such systems is that they do not operate when the water is calm.

SUMMARY OF THE INVENTION

Accordingly, an object of the present invention is to provide a pumping system which will operate regularly and dependably at least once a day and mostly twice a day in response to the rise and fall of the tide.

Another object is to provide such a system wherein a working head of water is produced which is nearly double the tidal head between high and low tide.

Another object is to provide such a system which is automatic in operation and requires no supervision.

A further object is to provide a simple, practical system which cannot get out of order.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system which comprises in combination a first tank supported in tidal water in which the boat is moored or the dock floats having an opening and an inlet at the upper end thereof through which water enters near high tide and having an outlet at the lower end thereof, a tube connected in said outlet and extending through said opening and provided with a check valve for connecting said tube to the lower end of said first tank; a fixed second tank having first and second openings at the lower end thereof and having a third opening at the upper end thereof; a stand pipe connected to the first opening having a lower end inlet submerged in the water at all times to fill said second tank at high tide; a vent pipe connected to the second opening having an inlet located to be exposed to atmosphere at low tide to enable the second tank to empty at low tide; a fixed third tank elevated above the water having a first opening at the upper end thereof and a second opening at the lower end thereof; first conduit means connecting the upper end openings of the second and third tanks; second conduit means connecting the upper end of the tube of the first tank and the lower end opening of the third tank; a jet pump having an inlet at the bottom of the boat or floating dock, an overboard outlet, and a nozzle; and third conduit means connecting the lower end of the tube of the first tank and said nozzle, whereby as the tide rises the first and second tanks are filled with water and as the tide falls the second tank empties to create a vacuum for causing water to be drawn from the first tank through the check valve into the third tank which vacuum is broken when the second tank is emptied and the vent pipe is exposed to atmosphere so that water flows from the third tank through the tube of the first tank and through the nozzle to operate the jet pump to pump water out of the boat or floating dock.

BRIEF DESCRIPTION OF THE DRAWINGS

FIG. 6 and FIG. 7 are tidal charts.

DESCRIPTION OF THE PREFERRED EMBODIMENT

Figure 1:
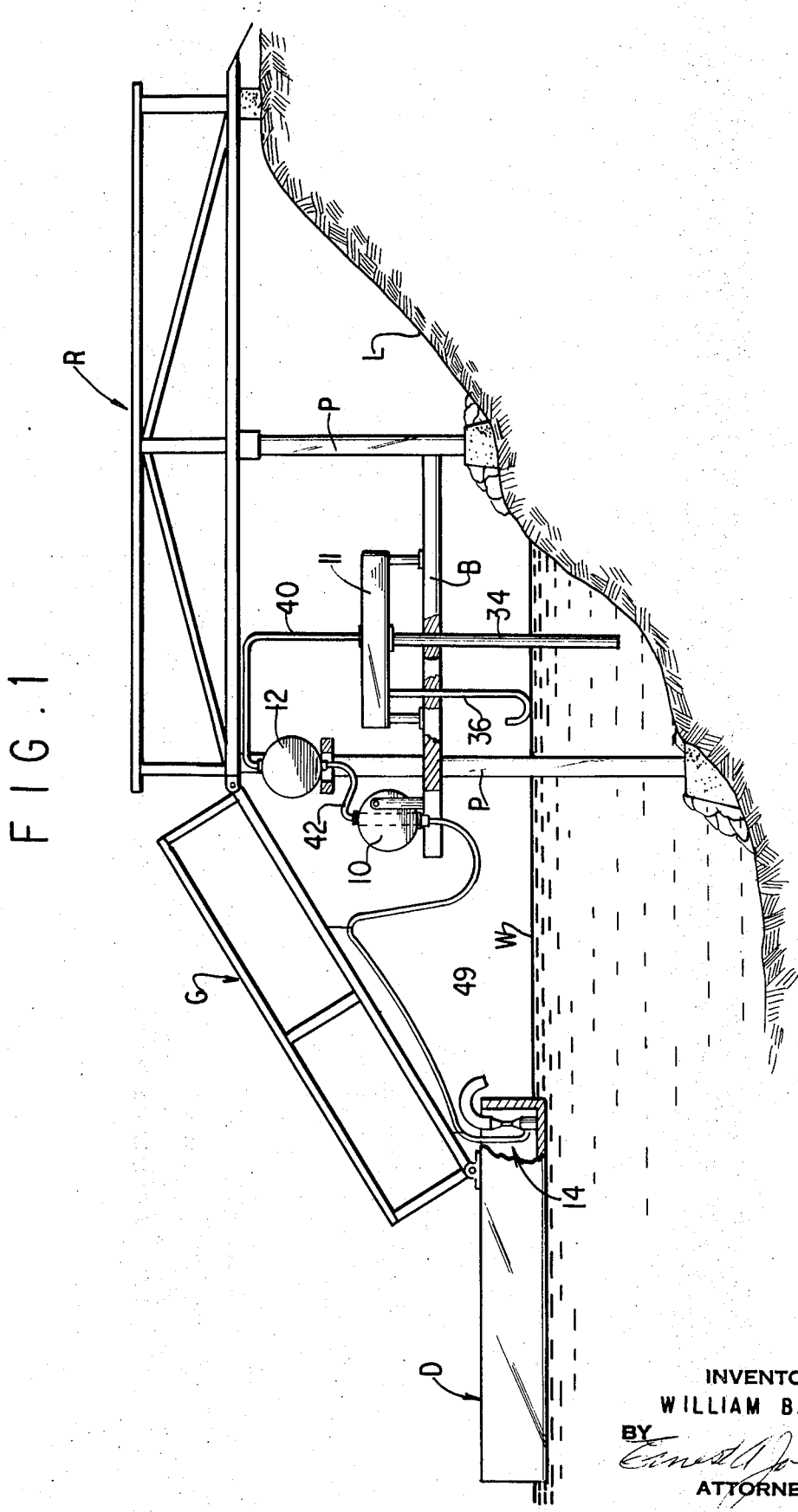
FIG. 1 is a side elevational view illustrating the installation of a system in accordance with the present invention.

Referring now to FIG. 1 of the drawings in detail, an installation of a system is shown including a runway R which extends from the land L across the water W and is supported by piles P, a horizontal beam B secured to the piles, a dock or float D floating on the water, a gangplank G having its upper end pivotally connected to the outer end of the runway and having its lower end supported by the dock.

The system for pumping water out of the dock D generally comprises a first tank 10 supported by the beam B, a second tank 11 fixed to the beam, a third tank 12 fixed to one of the piles P, and a jet pump 14 in the float.

Figure 2:
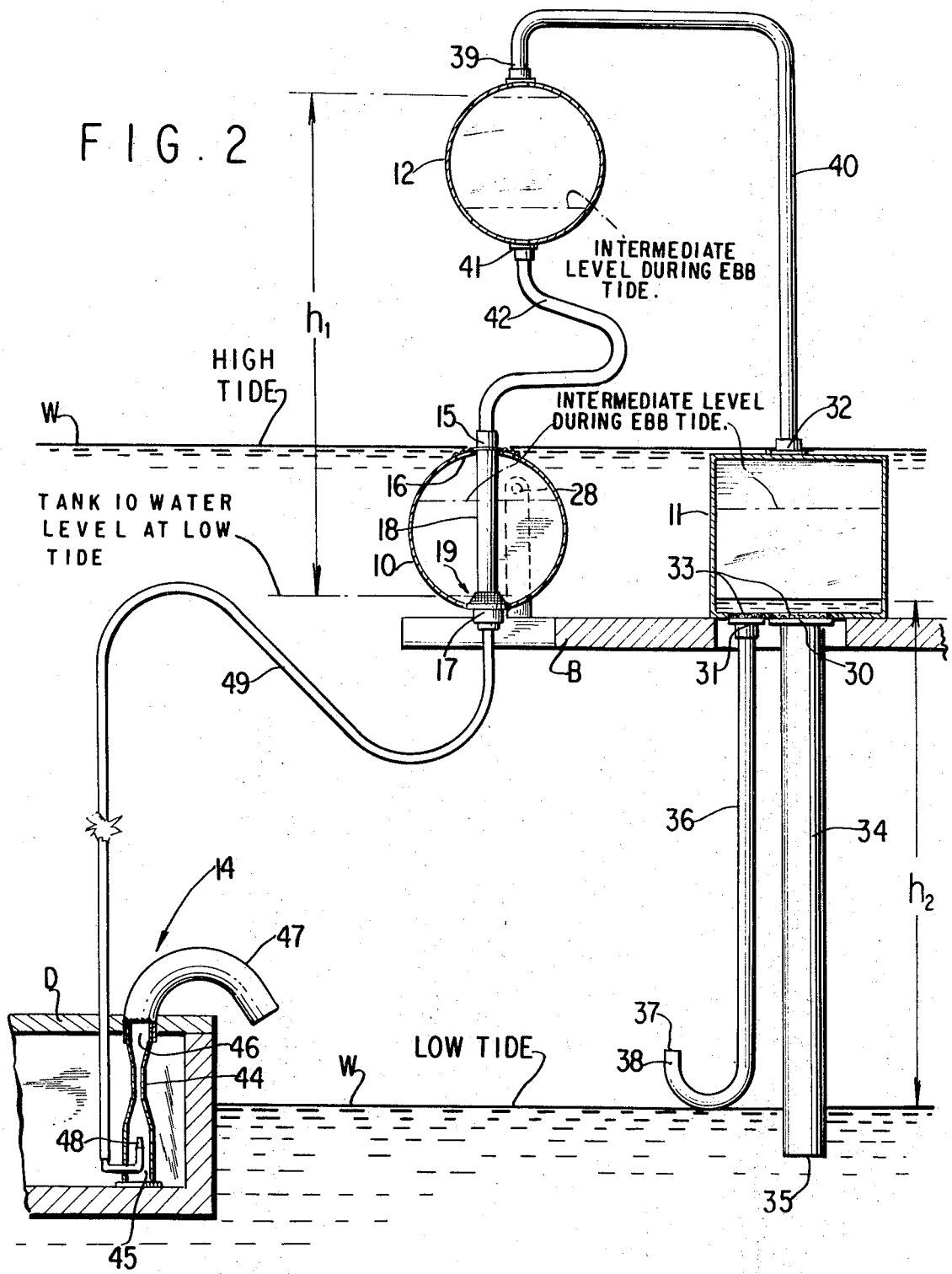
FIG. 2 is a schematic view partly in section illustrating the essential components of the system.

As shown in FIG. 2, the tank 10 has at its upper end an opening 15 and an inlet 16 through which water enters, an outlet 17 at its lower end, and a tube 18 connected in and extending through the opening 15 and the outlet 17 which tube is provided with a check valve 19 at the bottom of the tank.

Figure 3:
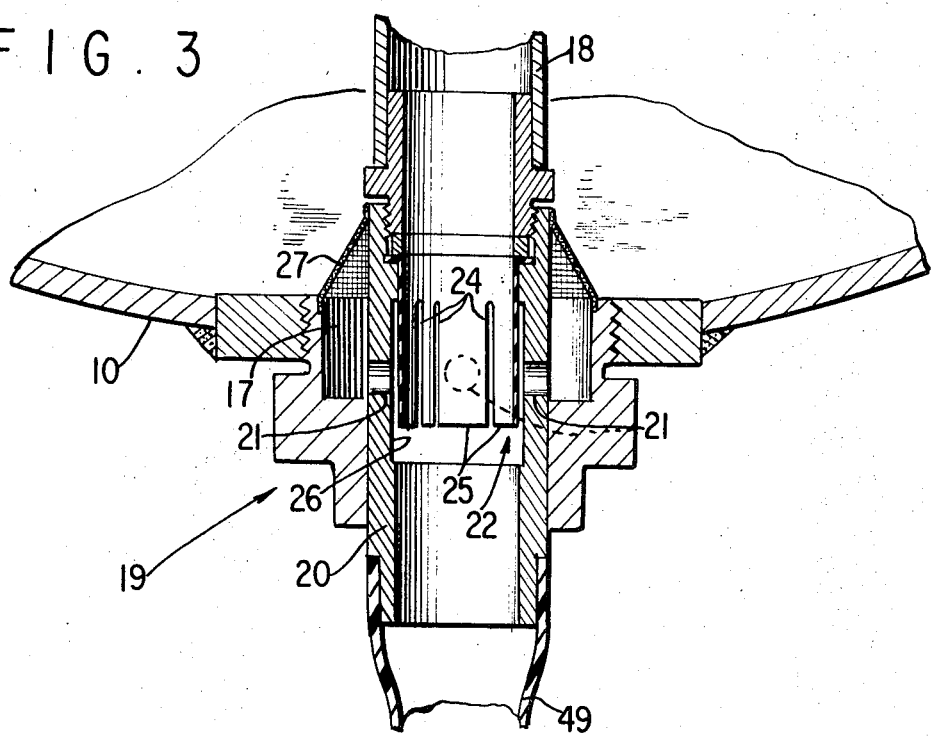
FIG. 3 is an enlarged sectional view taken along the line 3—3 on FIG. 2 illustrating a check valve.

As shown in FIG. 3, the check valve 19 includes a hollow cylindrical body 20 provided with circumferentially spaced inlet ports 21, and a flexible sleeve 22 secured in the valve body and normally closing the ports 21. The sleeve is provided with a vertical slit 24 between adjacent ports to divide the sleeve into a series of individual valve member flaps 25 for the ports. An undercut 26 is provided below the lower end of the sleeve which serves as a leakage path for air trapped in the system during flood tide. Preferably a screen 27 is positioned between the ports and the interior of the tank 10 to filter out solid particles.

Figure 5:
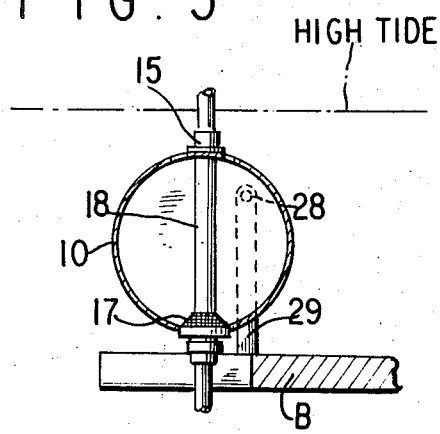
FIG. 4 and FIG. 5 are schematic views illustrating an arrangement for pivotally mounting the first tank.
Figure 4:
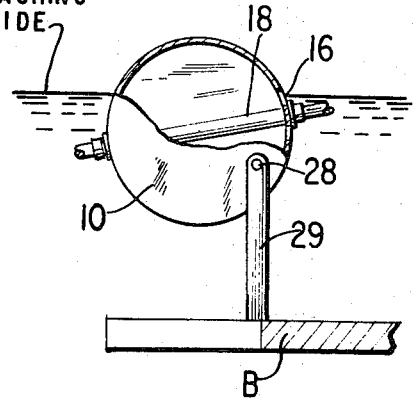

As shown in FIGS. 4 and 5, the upper end of the tank 10 is pivotally mounted at 28 on an upright post 29 supported by the beam B. This arrangement enables the tank to swing upwardly (FIG. 4) as the tide rises so that water enters through the inlet 16 as high tide is approached. As the tank 10 is being filled, it swings downwardly but maintains the inlet 16 exposed to the water so that the tank 10 is substantially full at high tide and its tube 18 is in vertical position (FIG. 5).

The second or vacuum tank 11 has first and second openings 30 and 31 at the lower end thereof and has a third opening 32 at the upper end thereof. A screen 33 is disposed across the opening 30 and 31 to filter out solid particles. A stand pipe 34 is connected to the opening 30 which has a lower end inlet 35 submerged in the water at all times so that the tank 11 is filled as the tide rises. A vent pipe 36 is connected to the opening 31 which has an inlet 37 at its lower end located to be exposed to atmosphere at low tide to enable the tank 11 to empty at low tide. Preferably, the vent pipe has a U-shaped section 38 at its lower end provided with the inlet 37 which faces upwardly and serves to prevent premature triggering of the system due to wave action.

The third tank 12 has an opening 39 at the upper end thereof connected by conduit means 40 to the opening 32 of the tank 11 and has an opening 41 at the lower end thereof connected by conduit means 42 to the upper end of the tube 18 of the tank 10. The tank 12 is supported in fixed position above the high tide level a distance about equal to the mean high and low tide levels to thereby serve as a high head reservoir. The volumetric capacity of the tank 12 is at least equal to or the same as that of the tank 10 so that the tank 12 can receive all the water which has entered the tank 10. The tank 11 has a much larger volumetric capacity than the tanks 10 and 12 in order to create a sufficient vacuum to draw all of the water from the tank 10 into the tank 12. The stand pipe 34 has a much larger cross-sectional area than the vent pipe 36.

The jet pump 14 comprises a venturi tube 44 having an inlet 45 located at the bottom of the dock D and having an outlet 46 provided with a hose 47 for discharging water overboard of the boat, and a nozzle 48 in the venturi tube connected by conduit means 49 to the lower end of the tube 18 of the tank 10.

In operation, at the low tide water level LT the lower end of the stand pipe 34 of the tank 11 is submerged in the water W, the inlet 37 of the vent pipe section 38 is above the low tide water level, and the tank 11 is empty. As the tide floods or rises, water enters the tank 11 by way of the stand pipe and the vent pipe to completely fill the tank 11 at high tide. While this occurs, the tank 12 is empty and air trapped in the system escapes through the leakage path 26 of the check valve 19 and is discharged to atmosphere through the inlet 16 of the tank 10.

As the high tide water level HT is approached, water enters the upper end inlet 16 of the tank 10 and fills the tank by the time high tide occurs.

As the tide ebbs or falls, the tank 11 is emptied by way of its stand pipe 34 and vent pipe 36 so that a vacuum is created in the tanks 11 and 12. As a result of the pressure differential thus created, water is drawn upwardly from the tank 10 into the tank 12 through the check valve 19, the tube 18 and the conduit means 42. The height difference between the water levels in tanks 10 and 12 is equal to the water level height in the tank 11 above the level of the water W because the same pressure differential exists across both columns of water.

As the level of the water continues to drop, the vent pipe inlet 37 is uncovered. When the level of the water reaches the bottom of the U-shaped section 38, the water column in the vent pipe becomes unstable and will not support the pressure differential whereupon the column is drawn into the tank 11. This causes the tank 11 to be vented to atmosphere so that any water remaining in the tank 11 is discharged through the stand pipe 34. When the vacuum in the tank 11 is broken, the tank 12 also is exposed to atmosphere by way of the conduit means 40 whereupon gravity flow of water from the tank 12 through the conduit means 42, the tube 18 and past the check valve 19 commences. The resultant head closes the check valve to permit free flow of water through the conduit means 49 and into the jet pump 14, whereby the jet pump is operated and draws water out of the dock D for overboard discharge.

In FIG. 6, a chart of low tide data for the months of June, July and August 1968 is shown which was compiled from tide tables of the United States Department of Commerce.

When $$\frac{h - h \text{ min.}}{h \text{ max.} - h \text{ min.}} = 0.8$$

then $$\frac{N}{N_T} = 0.90$$

This means that 90% of the low tides which occurred in the three month period will trigger the system. The eighteen events (0.10×178) that will not trigger the system are spread over a three month period so that at least one of the two low tides occurring each day will trigger the system and assure daily pumping.

Solving for $h$ with the constants given on the chart, $h$ equals 1.3 feet above mean low water where the bottom of the U-shaped section 38 is located.

In FIG. 7, a chart of high tide data for the months of June, July and August 1968 is shown which was compiled from tide tables of the United States Department of Commerce.

When $$\frac{H - H \text{ min.}}{H \text{ max.} - H \text{ min.}} = 0.30$$

then $$\frac{N}{N_T} = 0.20$$

This means that 20% of the high tides that occurred in the three months will not completely fill the tanks 10 and 11. Some of the "low" high tide may occur just before a nontriggering low tide event whereby the operation of the system is not adversely affected.

Solving H with the constants given on the chart (FIG. 7), H equals 8.2 feet above mean low water where the tops of the tanks 10 and 11 are located.

The available tidal head of the system $\Delta h$ equals $H - h$ or 8.2 −1.3 equals 6.9 feet.

Allowing for a 0.5 ft. drop in the tank 11, the top of the tank 12 can be placed 6.4 feet above the bottom of the tank 10 ($\Delta H_{12}$ equals 6.9−0.5 equals 6.4).

Thus the available head, $\Delta H_s$, of the system will be equal to 6.9+6.4 or 13.3 feet. Deducting 2.0 feet for the height of tank 10, the working head will be 11.3 feet. This suggests that the tank 10 should be a long container of small diameter in order to make the system most efficient.

Also, the loop in the conduit means 49 preferably at all times is maintained above the water level in the tank 10 to prevent drainage into the float.

SUMMATION

From the foregoing description it will be seen that the present invention provides an effective system for pumping water out of docks or boats floating on tidal water. Since there are two tides each day, there is assurance that the system will operate at least once a day and mostly twice a day without any supervision.

I claim:

1. In a system for pumping water out of the bottom of a moored boat or floating dock operable by the rise and fall of tides, the combination of a first tank supported in tidal water in which the boat is moored or the dock floats having an opening and an inlet at the upper end thereof through which water enters near high tide and having an outlet at the lower end thereof, and a tube connected in said outlet and extending through said opening and provided with a check valve for connecting said first tank to its lower end; a fixed second tank having first and second openings at the lower end thereof and having a third opening at the upper end thereof; a stand pipe connected to said first opening having a lower end inlet submerged in the water at all times to fill said second tank at high tide; a vent pipe connected to said second opening having an inlet located to be exposed to atmosphere at low tide to enable said second tank to empty at low tide; a fixed third tank elevated above the water having a first opening at the upper end thereof and a second opening at the lower end thereof; first conduit means connecting the upper end openings of said second and third tanks; second conduit means connecting the upper end of said tube of said first tank and the lower end opening of said third tank; a jet pump having an inlet at the bottom of the boat or floating dock, an overboard outlet, and a nozzle; an third conduit means connecting the lower end of said tube of said first tank and said nozzle, whereby as the tide rises said first and second tanks are filled with water and as the tide falls said second tank empties to create a vacuum for causing water to be drawn from said first tank into said third tank which vacuum is broken when said second tank is emptied and said vent pipe is exposed to atmosphere so that water flows from said third tank through said tube of said first tank and through said nozzle to operate said jet pump to pump water out of the boat or floating dock.

2. In a system according to claim 1, wherein said first tank is pivotally mounted at its upper end on a fixed support.

3. A system according to claim 1, wherein the tops of the first and second tanks are at about the same level.

4. A system according to claim 3, wherein said vent pipe has a U-shaped section at its lower end which is provided with its said inlet falling upwardly and has the bottom thereof located at the low tide water level.

5. A system according to claim 4, wherein the distance between the bottom of said U-shaped section and the lower end of said second tank and the distance between the lower end of said first tank and the upper end of said third tank are about equal.

6. A system according to claim 1, wherein the volumetric capacity of said third tank is at least equal to or the same as that of said first tank and said second tank has a much larger volumetric capacity than said first and third tanks.

7. A system according to claim 1, wherein said stand pipe has a much larger cross-sectional area than said vent pipe.

References Cited

UNITED STATES PATENTS

| | | | |
|---|---|---|---|
| 1,032,337 | 7/1912 | Kindleberger | 103—66 |
| 1,967,231 | 7/1934 | Engstrand et al. | |
| 2,271,480 | 1/1942 | Gibson et al. | 61—19 |
| 2,297,185 | 9/1942 | Hollander et al. | |
| 3,289,592 | 12/1966 | Franzreb | 103—68 |
| 3,391,903 | 7/1968 | Peterson | 103—64 X |
| 3,426,540 | 2/1969 | Fixel | 61—20 |

DONLEY J. STOCKING, Primary Examiner

W. J. KRAUSS, Assistant Examiner

U.S. Cl. X.R.

61—20; 103—64, 262; 417—100, 118